(12) United States Patent
Salowe

(10) Patent No.: US 9,251,299 B1
(45) Date of Patent: Feb. 2, 2016

(54) METHODS, SYSTEMS, AND ARTICLES OF MANUFACTURE FOR ASSOCIATING TRACK PATTERNS WITH RULES FOR ELECTRONIC DESIGNS

(71) Applicant: Cadence Design Systems, Inc., San Jose, CA (US)

(72) Inventor: Jeffrey S. Salowe, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/931,689

(22) Filed: Jun. 28, 2013

(51) Int. Cl.
*G06F 17/50* (2006.01)

(52) U.S. Cl.
CPC .................................... *G06F 17/50* (2013.01)

(58) Field of Classification Search
CPC ................................ G06F 17/30; G06F 17/50
USPC ............................................................. 716/55
See application file for complete search history.

(56) References Cited

U.S. PATENT DOCUMENTS

| | | | |
|---|---|---|---|
| 2,915,831 A | 12/1959 | Parker | |
| 4,484,292 A | 11/1984 | Hong et al. | |
| 4,811,237 A | 3/1989 | Putatunda et al. | |
| 5,535,134 A * | 7/1996 | Cohn et al. | 716/112 |
| 5,644,500 A | 7/1997 | Miura et al. | |
| 5,729,469 A | 3/1998 | Kawakami | |
| 5,770,481 A | 6/1998 | Fujii | |
| 5,781,446 A | 7/1998 | Wu | |
| 5,801,959 A | 9/1998 | Ding et al. | |
| 6,011,912 A | 1/2000 | Yui et al. | |
| 6,298,468 B1 | 10/2001 | Zhen | |
| 6,324,675 B1 | 11/2001 | Dutta et al. | |
| 6,349,403 B1 | 2/2002 | Dutta et al. | |
| 6,370,673 B1 | 4/2002 | Hill | |
| 6,407,434 B1 | 6/2002 | Rostoker et al. | |
| 6,490,713 B2 | 12/2002 | Matsumoto | |
| 6,505,333 B1 | 1/2003 | Tanaka | |
| 6,543,041 B1 | 4/2003 | Scheffer et al. | |
| 6,557,145 B2 | 4/2003 | Boyle et al. | |
| 6,557,153 B1 | 4/2003 | Dahl et al. | |
| 6,609,237 B1 | 8/2003 | Hamawaki et al. | |
| 6,763,512 B2 | 7/2004 | Xing | |
| 6,769,105 B1 | 7/2004 | Teig et al. | |

(Continued)

OTHER PUBLICATIONS

Non-Final Office Action dated Jun. 13, 2014 for U.S. Appl. No. 13/931,627.

(Continued)

*Primary Examiner* — Mohammed Alam
(74) *Attorney, Agent, or Firm* — Vista IP Law Group, LLP

(57) ABSTRACT

One aspect creates or identifies a rule, identifies or creates track pattern(s), and associate the rule with the track pattern(s). The rule is used to guide physical implementation tools to implement electronic designs which not only satisfy the constraints of the rule but also the constraints of the track pattern(s). Some other aspects are directed at interpretation or automatic association or assignment of a layer constraint by determining whether a track pattern on a layer with a first rule matches a second rule, and adding the track pattern to the layer constraint for the second rule on the layer. Another aspect is directed at automatic creation of a rule by creating a new rule, examining each track pattern associated with a first rule, determining whether the new rule matches the first rule, and adding the track pattern to a layer constraint for the new rule.

20 Claims, 15 Drawing Sheets

(56) References Cited

U.S. PATENT DOCUMENTS

| | | | |
|---|---|---|---|
| 6,813,755 B2 | 11/2004 | Xing | |
| 6,851,100 B1 | 2/2005 | You et al. | |
| 6,892,371 B1 | 5/2005 | Teig et al. | |
| 6,931,616 B2 | 8/2005 | Teig et al. | |
| 6,938,226 B2 | 8/2005 | Nguyen et al. | |
| 6,938,234 B1 | 8/2005 | Teig et al. | |
| 6,957,407 B2 | 10/2005 | Suto | |
| 6,957,411 B1 | 10/2005 | Teig et al. | |
| 6,981,235 B1 | 12/2005 | Salowe et al. | |
| 6,996,512 B2 | 2/2006 | Alpert et al. | |
| 7,016,794 B2 | 3/2006 | Schultz | |
| 7,039,881 B2 | 5/2006 | Regan | |
| 7,051,313 B1 | 5/2006 | Betz et al. | |
| 7,076,750 B1 | 7/2006 | Lukanc | |
| 7,089,526 B1 | 8/2006 | Salowe et al. | |
| 7,096,445 B1 | 8/2006 | Pucci et al. | |
| 7,100,128 B1 | 8/2006 | Nequist et al. | |
| 7,107,564 B1 | 9/2006 | Teig et al. | |
| 7,117,468 B1 | 10/2006 | Teig et al. | |
| 7,139,993 B2 | 11/2006 | Proebsting et al. | |
| 7,222,322 B1 | 5/2007 | Chyan | |
| 7,257,797 B1 | 8/2007 | Waller et al. | |
| 7,363,607 B2 | 4/2008 | Birch et al. | |
| 7,516,433 B1 | 4/2009 | Pucci et al. | |
| 7,523,430 B1 | 4/2009 | Patel | |
| 7,594,214 B1 | 9/2009 | Salowe et al. | |
| 7,640,520 B2 | 12/2009 | Wang et al. | |
| 7,657,852 B2 | 2/2010 | Waller | |
| 7,694,261 B1 | 4/2010 | Chyan et al. | |
| 7,735,043 B2 | 6/2010 | Ueda | |
| 7,752,590 B1 | 7/2010 | Chyan et al. | |
| 7,802,208 B1 | 9/2010 | Waller et al. | |
| 7,890,909 B2 | 2/2011 | Pyapali et al. | |
| 7,934,177 B2 | 4/2011 | Shin | |
| 7,958,480 B1 | 6/2011 | Slonim et al. | |
| 8,006,216 B1 | 8/2011 | Chen et al. | |
| 8,028,253 B2 | 9/2011 | Drapeau | |
| 8,032,856 B2 | 10/2011 | Itagaki | |
| 8,045,546 B1 | 10/2011 | Bao et al. | |
| 8,050,256 B1 | 11/2011 | Bao et al. | |
| 8,108,823 B1 | 1/2012 | Allen et al. | |
| 8,239,806 B2 | 8/2012 | Chen et al. | |
| 8,250,507 B1 | 8/2012 | Agarwal et al. | |
| 8,286,111 B2 | 10/2012 | Chandra et al. | |
| 8,375,348 B1 | 2/2013 | Raj et al. | |
| 8,418,110 B2 | 4/2013 | Keinert et al. | |
| 8,473,885 B2 | 6/2013 | Cohn et al. | |
| 8,490,036 B2 | 7/2013 | Waller | |
| 8,495,547 B2 | 7/2013 | Keinert et al. | |
| 8,495,549 B2 | 7/2013 | Maruyama et al. | |
| 8,510,703 B1 | 8/2013 | Wadland et al. | |
| 8,560,998 B1 | 10/2013 | Salowe et al. | |
| 8,612,914 B2 | 12/2013 | Sherlekar et al. | |
| 8,640,080 B1 | 1/2014 | Salowe et al. | |
| 8,645,893 B1 | 2/2014 | Yeung et al. | |
| 8,671,368 B1 | 3/2014 | Salowe et al. | |
| 8,683,418 B2 | 3/2014 | Bose et al. | |
| 8,689,121 B2 | 4/2014 | O'Riordan | |
| 8,737,392 B1 | 5/2014 | Bao et al. | |
| 8,769,455 B1 | 7/2014 | Singh et al. | |
| 8,782,586 B2 * | 7/2014 | Sezginer et al. | 716/126 |
| 2001/0038612 A1 | 11/2001 | Vaughn | |
| 2003/0014201 A1 | 1/2003 | Schultz | |
| 2003/0084418 A1 | 5/2003 | Regan | |
| 2003/0126578 A1* | 7/2003 | Wadland et al. | 716/12 |
| 2004/0143797 A1 | 7/2004 | Nguyen et al. | |
| 2006/0288323 A1 | 12/2006 | Birch | |
| 2007/0044060 A1 | 2/2007 | Waller | |
| 2007/0101303 A1 | 5/2007 | Lien | |
| 2007/0106969 A1* | 5/2007 | Birch et al. | 716/6 |
| 2007/0162884 A1* | 7/2007 | Matsuno et al. | 716/13 |
| 2007/0245286 A1 | 10/2007 | Ueda | |
| 2008/0072182 A1 | 3/2008 | He et al. | |
| 2008/0244504 A1 | 10/2008 | Drapeau | |
| 2009/0055792 A1 | 2/2009 | Itagaki | |
| 2009/0144688 A1 | 6/2009 | Uchino et al. | |
| 2009/0172628 A1 | 7/2009 | Chyan | |
| 2010/0011327 A1 | 1/2010 | Becker et al. | |
| 2010/0037200 A1 | 2/2010 | Ghan | |
| 2010/0100862 A1 | 4/2010 | Ohtsuka | |
| 2010/0106274 A1 | 4/2010 | Konno et al. | |
| 2010/0115479 A1* | 5/2010 | Hatano et al. | 716/4 |
| 2010/0122227 A1 | 5/2010 | Waller | |
| 2010/0122228 A1 | 5/2010 | McCracken et al. | |
| 2010/0199253 A1 | 8/2010 | Cheng et al. | |
| 2010/0205575 A1 | 8/2010 | Arora et al. | |
| 2010/0229140 A1 | 9/2010 | Strolenberg et al. | |
| 2010/0306727 A1 | 12/2010 | Itagaki | |
| 2011/0014786 A1 | 1/2011 | Sezginer | |
| 2011/0055784 A1 | 3/2011 | Gao et al. | |
| 2011/0119648 A1 | 5/2011 | Chen et al. | |
| 2011/0185329 A1 | 7/2011 | Wen et al. | |
| 2011/0214100 A1 | 9/2011 | McElvain | |
| 2011/0219341 A1 | 9/2011 | Cao et al. | |
| 2011/0260318 A1 | 10/2011 | Eisenstadt | |
| 2011/0296360 A1 | 12/2011 | Wang et al. | |
| 2012/0079442 A1 | 3/2012 | Akar et al. | |
| 2012/0131528 A1 | 5/2012 | Chen et al. | |
| 2012/0241986 A1 | 9/2012 | Sherlekar et al. | |
| 2012/0286331 A1 | 11/2012 | Aton et al. | |
| 2013/0019220 A1 | 1/2013 | Maruyama et al. | |
| 2013/0036396 A1 | 2/2013 | Arayama et al. | |
| 2013/0086543 A1 | 4/2013 | Agarwal et al. | |
| 2013/0086545 A1 | 4/2013 | Alpert et al. | |
| 2013/0155555 A1 | 6/2013 | Blanc et al. | |
| 2013/0159965 A1 | 6/2013 | Karatal et al. | |
| 2014/0157220 A1 | 6/2014 | Arayama et al. | |
| 2014/0167117 A1 | 6/2014 | Quandt et al. | |

OTHER PUBLICATIONS

Final Office Action dated May 1, 2014 for U.S. Appl. No. 13/931,707.
Notice of Allowance dated Sep. 25, 2014 for U.S. Appl. No. 13/931,707.
Notice of Allowance dated Nov. 10, 2014 for U.S. Appl. No. 13/931,503.
Non-Final Office Action dated Jul. 15, 2014 for U.S. Appl. No. 14/044,838.
Li et al., "NEMO: A New Implicit-Connection Graph-Based Gridless Router With Multilayer Planes and Pseudo Tile Propagation," IEEE Trans. on CAD of ICs & Systems, vol. 26, No. 4 Apr. 2007, pp. 705-718.
Lin et al., "Double Patterning Lithography Aware Grid less Detailed Routing with Innovative Conflict Graph," DAC'10, Jun. 13-18, 2010, pp. 398-403.
Agilent Technologies, "Momentum", 2006, Agilient, pp. 1-40.
Cho et al., "Double Patterning Technology Friendly Detailed Routing", IEEE/ACM International Conference, 2008, pp. 506-511.
Dion et al., Contour: A Tile-based Gridless Router, 30 pages, Western Research Laboratory, Mar. 1995.
Non-Final Office Action dated Sep. 19, 2013 for U.S. Appl. No. 13/602,071.
Notice of Allowance dated Mar. 21, 2014 for U.S. Appl. No. 13/602,071.
Notice of Allowance dated Jul. 14, 2014 for U.S. Appl. No. 13/602,071.
Ex-parte Quayle Office Action dated May 23, 2014 for U.S. Appl. No. 13/602,069.
Non-Final Office Action dated Sep. 20, 2013 for U.S. Appl. No. 13/602,069.
Final Office Action dated Oct. 4, 2013 for U.S. Appl. No. 13/705,164.
Non-Final Office Action dated Jun. 5, 2013 for U.S. Appl. No. 13/705,164.
Non-Final Office Action dated Sep. 3, 2014 for U.S. Appl. No. 13/705,164.
Notice of Allowance dated Jan. 22, 2014 for U.S. Appl. No. 13/705,164.
Notice of Allowance dated May 16, 2014 for U.S. Appl. No. 13/705,164.
Final Office Action dated Jul. 17, 2014 for U.S. Appl. No. 13/931,503.

(56) References Cited

OTHER PUBLICATIONS

Non-Final Office Action dated Aug. 4, 2014 for U.S. Appl. No. 13/931,568.
Hsu et al., "Template-Mask Design Methodology for Double Patterning Technology," 2010 IEEE, pp. 107-111.
Hwang, Chanseok, and Massoud Pedram. "Interconnect design methods for memory design." Proceedings of the 2004 Asia and South Pacific Design Automation Conference. IEEE Press, 2004.
Jeffrey Salowe, "Gridding for Advanced Process Nodes" 2012.
Jones, David L., "PCB Design Tutorial, Revision A", Jun. 29, 2004, David L. Jones and www.alternatezone.com, pp. 1-25.
Lin, I-Jye, Tsui-Yee Ling, and Yao-Wen Chang. "Statistical circuit optimization considering device and interconnect process variations." Proceedings of the 2007 international workshop on System level interconnect prediction. ACM, 2007.
Ou, Hung-Chih, Hsing-Chih Chang Chien, and Yao-Wen Chang. "Simultaneous analog placement and routing with current flow and current density considerations." Proceedings of the 50th Annual Design Automation Conference. ACM, 2013.
Pompl, T., et al. "Practical aspects of reliability analysis for IC designs." Proceedings of the 43rd annual Design Automation Conference. ACM, 2006.
Singh, Jaskirat, and Sachin S. Sapatnekar. "Topology optimization of structured power/ground networks." Proceedings of the 2004 international symposium on Physical design. ACM, 2004.
U.S. Appl. No. 12/980,744, filed Dec. 29, 2010.
U.S. Appl. No. 13/602,069, filed Aug. 31, 2012.
U.S. Appl. No. 13/602,071, filed Aug. 31, 2012.
U.S. Appl. No. 13/692,970, filed Dec. 3, 2012.
U.S. Appl. No. 13/705,164, filed Dec. 4, 2012.
U.S. Appl. No. 13/719,058, filed Dec. 18, 2012.
Wang, Laung-Terng, Charles E. Stroud, and Nur A. Touba. System-on-chip test architectures: nanometer design for testability. Morgan Kaufmann, 2010.
Office Action dated Oct. 28, 2013 for U.S. Appl. No. 13/931,707.
Office Action dated Apr. 2, 2014 for U.S. Appl. No. 13/931,503.
Notice of Allowance dated Apr. 8, 2015 for U.S. Appl. No. 13/931,568.
Notice of Allowance dated Jun. 10, 2015 for U.S. Appl. No. 14/318,507.
Notice of Allowance dated Mar. 3, 2015 for U.S. Appl. No. 13/931,627.
Non-Final Office Action dated Mar. 10, 2015 for U.S. Appl. No. 14/318,507.
Final Office Action dated Nov. 13, 2014 for U.S. Appl. No. 14/044,836.
Non-Final Office Action dated Dec. 19, 2014 for U.S. Appl. No. 14/318,507.
Final Office Action dated Nov. 17, 2014 for U.S. Appl. No. 13/931,627.
Final Office Action dated Dec. 31, 2014 for U.S. Appl. No. 13/931,568.
Notice of Allowance dated Aug. 10, 2015 for U.S. Appl. No. 14/318,507.

\* cited by examiner

1102 Grouping Two Exemplary Track Patterns: Either 1xTrack1 Or 1xTrack2 is Available for the Router to Use By Using -Pattern_Group_Name
    *set_track_pattern –start s1 –repeat 100000 –x false –spacing Val1 –name "1xTrack1" –layer M2 –constraint_group "onex_rule" – pattern_group_name "1x"*

*set_track_pattern –start s2 –repeat 100000 –x false –spacing Val2 –name "1xTrack2" –layer M2 –constraint_group "onex_rule" – pattern_group_name "1x"*

1104 Grouping Two Exemplary Track Patterns: Either 1xTrack2 Or 2xTrack1 is Available for the Router to Use By Using -Pattern_Group_Name
    *set_track_pattern –start s2 –repeat 100000 –x false –spacing Val2 –name "1xTrack2" –layer M2 –constraint_group "onex_rule" – pattern_group_name "1x+2x"*

*set_track_pattern –start s3 –repeat 100000 –x false –spacing Val3 –name "2xTrack1" –layer M2 –constraint_group "twox_rule" – pattern_group_name "1x+2x"*

FIG. 11

METHODS, SYSTEMS, AND ARTICLES OF MANUFACTURE FOR ASSOCIATING TRACK PATTERNS WITH RULES FOR ELECTRONIC DESIGNS

CROSS-REFERENCE TO RELATED APPLICATION(S)

This Application is related to U.S. patent application Ser. No. 13/931,707 entitled "METHODS, SYSTEMS, AND ARTICLES OF MANUFACTURE FOR AUTOMATICALLY ASSIGNING TRACK PATTERNS TO REGIONS FOR PHYSICAL IMPLEMENTATION OF AN ELECTRONIC DESIGN", U.S. patent application Ser. No. 13/931,627 entitled "METHODS, SYSTEMS, AND ARTICLES OF MANUFACTURE FOR ASSIGNING TRACK PATTERNS TO REGIONS OF AN ELECTRONIC DESIGN", U.S. patent application Ser. No. 13/931,503 entitled "METHODS, SYSTEMS, AND ARTICLES OF MANUFACTURE FOR IMPLEMENTING A PHYSICAL ELECTRONIC DESIGN WITH AREA-BOUNDED TRACKS", and U.S. patent application Ser. No. 13/931,568 entitled "METHODS, SYSTEMS, AND ARTICLES OF MANUFACTURE FOR INTERACTIVELY IMPLEMENTING PHYSICAL ELECTRONIC DESIGNS WITH TRACK PATTERNS", the content of all four U.S. patent applications is hereby expressly incorporated by reference in its entirety for all purposes.

COPYRIGHT NOTICE

A portion of the disclosure of this patent document includes material, which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The task of all routers is the same—routers are given some pre-existing polygons consisting of pins on cells and optionally some pre-routes from the placers to create geometries so that all pins assigned to different nets are connected by wires and vias, that all wires and vias assigned to different nets do not overlap, and that all design rules are obeyed. That is, a router fails when two pins on the same net that should be connected are open, when two pins on two different nets that should remain open are shorted, or when some design rules are violated during routing.

A layout file is created from the placement and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process.

Traditionally, track patterns include parallel tracks with uniform pitches, and the tracks cover entire layout space. This conventional approach does not satisfy the needs for electronic layout with a typical half-pitch of 14 nm or below. With the typical half-pitch advancing to 14 nm or below, the track patterns for a certain metal layer may be required or desired to be region-based where one track pattern may be associated with or assigned to a region on one layer, while another track pattern may be associated with or assigned to another region on the same layer. Some designs may even demand or desire non-uniform track patterns. Conventional approaches do not allow periodic changes of track pitches and definitions of regions where one or more track patterns are active. These track pattern requirements pose a challenge for physical design implementation, especially for interactive layout editing. In addition, users may need to interactively define track pattern(s) during the chip floorplanning or placement stage and follow such track pattern(s) during subsequent physical design stages such as routing, post-layout optimization, engineering change order (ECO), or even specific physical design tasks such as wire editing.

In addition, advanced manufacturing groups have new requirements on where wires or interconnects may be routed. In particular, some routing tracks are intended for double-width wires, some are intended for single-width wires, and so on. Routing tracks, as they were originally devised, applied to every net or connection in the design. To address this, the user must explicitly add the constraints of the track patterns to the routing rules, which is impractical and prone to errors. Moreover, there has been no way to address trackPattern constraints on automatically-generated rules.

Thus, there exists a need for methods, systems, and articles of manufacture for associating track patterns with rules for electronic designs.

SUMMARY

Disclosed are method(s), system(s), and article(s) of manufacture for associating track patterns with rules for electronic designs in one or more embodiments. Some embodiments are directed at associating a rule with one or more track patterns by creating or identifying a rule that is used to guide physical implementation tools to implement electronic designs, identifying or creating one or more track patterns, and associating the created or identified rule with the one or more track patterns. As the rule is used to guide physical implementation tools, the physical implementation tools implement an electronic design which not only satisfies the requirements or constraints of the rule but also the requirements or constraints of the track pattern. Some other embodiments are directed at interpretation or automatic association or assignment of a layer constraint (e.g., a trackPattern constraint) by determining whether a track pattern on a layer with a first rule match a second rule, and adding the track pattern to the layer constraint for the second rule on the layer. Another aspect is directed at automatic creation of a rule by creating a new rule, examining each track pattern associated with a first rule, determining whether the new rule matches the first rule, and adding the track pattern to a layer constraint (e.g., a trackPattern constraint) for the new rule.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 11 illustrates a flow diagram for associating track patterns with rules for electronic designs in some embodiments.

DETAILED DESCRIPTION

Various embodiments of the invention are directed to a methods, systems, and articles of manufacture for implementing high current carrying interconnects. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for associating track patterns with rules for electronic designs in one or more embodiments. One aspect is directed at associating a rule with one or more track patterns by at least creating or identifying a rule that is used to guide electronic design implementation tools to implement electronic designs, identifying or creating one or more track patterns, and associating the created or identified rule with the one or more track patterns. As the rule is used to guide physical implementation tools, the association of a rule and track patterns enables the physical implementation tools to implement an electronic design while satisfying both the requirements or constraints of the rule and the requirements or constraints of the track patterns.

Another aspect is directed at interpretation or automatic association or assignment of a layer constraint (e.g., a trackPattern constraint) by at least determining whether a track pattern on a layer with a first rule match a second rule, and adding the track pattern to the layer constraint for the second rule on the layer. Another aspect is directed at automatic creation of a rule by creating a new rule, examining each track pattern associated with a first rule, determining whether the new rule matches the first rule, and adding the track pattern to a layer constraint (e.g., a trackPattern constraint) for the new rule. Various details of any of the processes, sub-processes, or acts are further provided below with reference to respective drawing figures.

Figure 1:
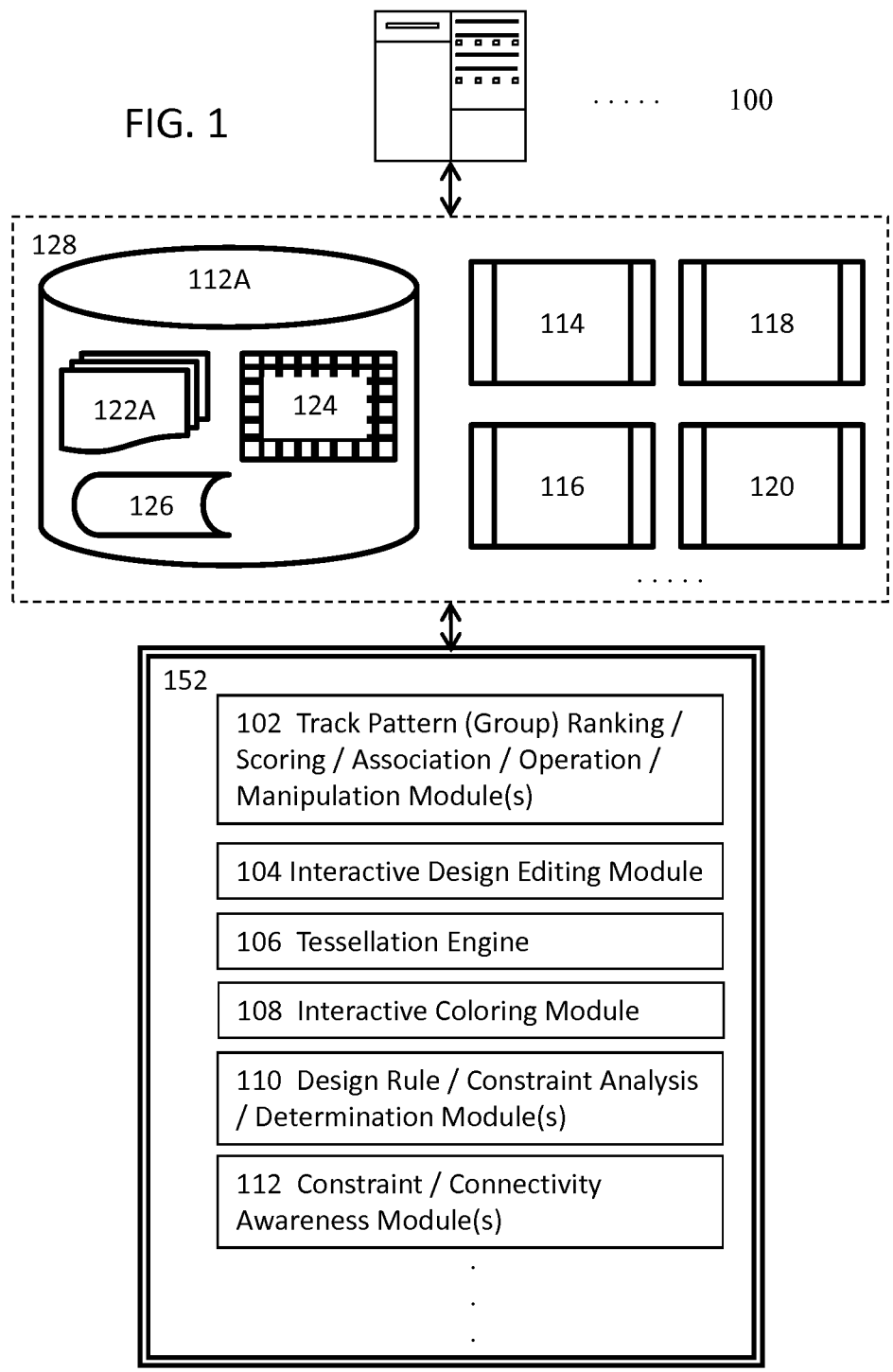
FIG. 1 illustrates a high level block diagram for a system for associating track patterns with rules for electronic designs in some embodiments.

FIG. 1 illustrates a high level block diagram for a system for interactively implementing physical electronic designs with track patterns in some embodiments. In one or more embodiments, the system for interactively implementing physical electronic designs with track patterns may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118, a verification engine 120, a floorplanner, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises a track pattern or track pattern group module 102 to rank or score a plurality of track patterns based on one or more criteria, an interactive design editing module 104 to provide the capabilities of interactive editing (e.g., adding, removing, or modifying) any part of an electronic design, a tessellation module 106 to tessellate an area of an electronic design into strips and to tessellate a strip into multiple regions either alone or jointly with one or more other modules, one or more interactive coloring modules 108 to provide interactive coloring capabilities for providing correct-by-construction electronic designs to be manufactured with multi-exposure techniques, various physical implementation tools such as a global router or a detail router, a layout or physical design editor, one or more modules 110 to perform design rule checks, constraint analysis (e.g., interactive constraint analysis), or to make various determinations, a constraint or connectivity awareness module 112 to provide a constraint and/or connectivity-aware environment to implement electronic designs, etc.

For example, the method or system may interactively check whether an electronic design complies with various constraints or design rules (collectively constraints), such as some net-based spacing constraints that impose some limitations on the spacing between two nets, in a nearly real-time manner while the electronic design is being created in some embodiments. In these embodiments, the disclosed method or system uses the connectivity information provided by a connectivity engine or assigned by a designer to present feedback to a user as to whether a newly created object or a newly modified object complies or violates certain relevant constraints in an interactive manner or in nearly real-time without having to perform such constraints checking in batch mode. More details about the aforementioned modules will become clear and self-explanatory in the remainder of the description with reference to various other drawing figures.

Figure 2A:
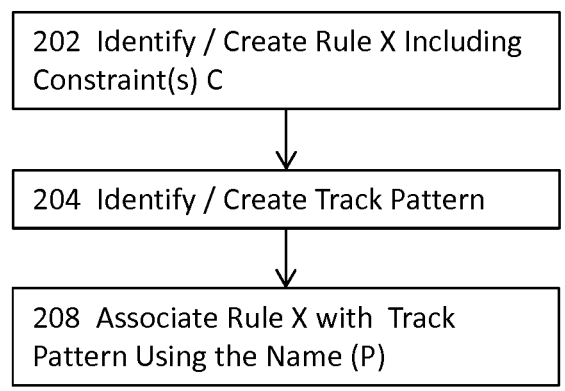
FIG. 2A illustrates a high level flow diagram for associating track patterns with rules for electronic designs in some embodiments.

FIG. 2A illustrates a high level flow diagram for associating track patterns with rules for electronic designs in some embodiments. More specifically, FIG. 2A illustrates a high level flow diagram for identifying or creating one or more track patterns and associating the one or more track patterns with rules in some embodiments. In one or more embodiments, the method for associating track patterns with rules for electronic designs may comprise the process 202 for identifying or creating a rule (e.g., a rule denoted by "X") including one or more constraints (e.g., one or more constraints denoted by "C"). In some of the embodiments, process 202 may identify such a rule from, for example, the rule deck including a plurality of rules guiding a physical implementation tool (e.g., a routing engine), or may create a rule for guiding a physical implementation tool to implement the electronic design on a layer L in a stack of layers in an electronic design.

In some embodiments, the method may comprise the process 204 for identifying or creating a track pattern. In some embodiments, process 204 identifies or creates a track pattern for a layer (L). In some other embodiments where the method does not specifically designate one or more layers for a particular track pattern identified or created at 204, the track pattern applies to all layers of an electronic design of interest. In some of these embodiments, process 204 may identify a track pattern from various sources. For example, process 204 may identify a track pattern from, for example, a track pattern repository or from customers or manufacturers in some embodiments. In addition or in the alternative, process 204 may create one or more track patterns in some embodiments.

A track may comprise a line of zero thickness on which the centerline of an interconnect lies. In some embodiments where a preferred or default routing direction is defined, a track along the preferred or default routing direction is called a right-way track. A track that does not lie along the preferred or default routing direction is called a wrong-way track in these embodiments.

For example, in a Manhattan routing approach, preferred or default routing directions of two adjacent metal layers (with a dielectric layer in between) are perpendicular to each other. If the lower metal layer is associated with a horizontal routing direction, then the horizontal tracks, if any, on the lower metal layer may be deemed the "right-way tracks". If the lower metal layer is further associated with vertical tracks, these vertical tracks are then deemed as the "wrong-way tracks" because they do not lie along the horizontal routing directions. In some embodiments, a track (e.g., a routing track) constitutes an imaginary line that spans at least across the region of interest and thus has no width. Nonetheless, some embodiments described herein may associate such a track with a width constraint or attribute such that only interconnects satisfying the width constraint or attribute may be implemented by using the track in these embodiments.

A track pattern comprises a collection of multiple tracks with one or more attributes including the start location of the track pattern, the number of repetitions of tracks in the track pattern, the layer on which the track pattern may reside, the orientation of the tracks, spacing between two adjacent tracks, or multi-patterning attribute(s) in some embodiments. In some embodiments, some processes or modules may identify or create a track pattern name for the track pattern such that the track pattern may be identified with the track pattern name. In some embodiments, some processes or modules may identify or create a track pattern group name for the track pattern such that the track pattern may be identified or defined with the track pattern group name.

For example, an exemplary track pattern may be declared by using the following syntax:

set_track_pattern -layer M2 -x false -start 0.032 -spacing 0.064 -repeat 1000000 -name TP_M2__3x -color_pattern BBRR In the above exemplary track pattern declaration or specification, the track pattern having the name "TP_M2__3x" resides on M2. In some embodiments where the "-layer" is not specified, the track pattern applies to all layers. In some embodiments, the track pattern name need not be layer specific as shown in this example. In some embodiments, preferred direction track patterns are usually specified on a per layer basis. In this exemplary track pattern declaration, the "3x" in the "-name" attribute indicates that the tracks in this track pattern are to be used to implement 3x-width interconnects—the centerline of a 3x-width wire coincides with a track in the track pattern. The tracks in this track pattern run in the horizontal direction (or the first direction) due to the attribute "-x false", whereas tracks with "-x true" will be in the vertical direction (or the second direction).

The above exemplary track pattern has a start location "0" as defined by the coordinate system and a spacing value of 0.064 between two adjacent tracks. Therefore, the exemplary track pattern has 1000000 such tracks starting at location "0" with spacing 0.064 between two adjacent tracks. The "-x false" attribute indicates that the tracks correspond to a "y location", and that the tracks are thus horizontal. On the other hand, "-x true" indicates that the tracks correspond to a "x location", and that the tracks are thus vertical. The attribute "-color_pattern" represents color assignment to the tracks and is used to specify the suggested color for multiple-patterning (e.g., double patterning). In this example, the color pattern "BBRR" indicates that the first track is color "blue", the second "blue", the third "red", the fourth "red", and that the color pattern repeats once every four tracks. The color of a circuit design feature indicates which mask design the circuit design feature belongs to, and therefore the use of colors "red" and "blue" is to distinguish circuit features on two different mask designs and is thus not intended to limit the scope of various other embodiments or the scope of the claims, unless otherwise specifically recited or claimed.

As another example, an exemplary track pattern may be declared by using the following syntax:

set_track_pattern -layer M2 -x false -start 0.032 -spacing 0.064 -repeat 1000000 -name TP_3x -color_pattern BBRR The above example shows that the track pattern "name" need not be specific to the layer. It shall be noted that the exemplary track pattern declaration or specification shown in the aforementioned examples is provided for illustration and explanation purposes and is not intended to limit the scope of various other embodiments or the scope of the claims, unless otherwise specifically recited or claimed. Therefore, a track pattern may be declared or specified in different manners. The above exemplary track pattern may be used in, for example, implementing power rails in some embodiments.

In some embodiments, the method may comprise the process 206 for associating the rule X with the track pattern using the track pattern name (P) as specified or declared in the track pattern declaration or specification. With the association between a track pattern and a rule, the rule guides physical implementation tools so that the physical implementation tools are aware of what properties or constraints a legal implementation should have and can thus produce legal implementation satisfying such properties or constraints.

Therefore, various embodiments enables physical implementation tools to produce legal physical implementation (e.g., floorplanning, placement, routing, post-route optimization, engineering change order process, etc.) that satisfies various track pattern constraints by working under the guide of rules that are associated with such various track pattern constraints. In the examples provided above, the track pattern properties or constraints comprise the width, spacing, and start location of interconnects implemented with the tracks in the track pattern. Nonetheless, various other properties or constraints may also be declared in a track pattern and associated with various rules.

In various embodiments, the rules are now made aware of one or more track pattern constraints by the declaration of the track pattern name in the track pattern declaration and the association of the track pattern with the rules via the track pattern name. The association between rules and track patterns also introduce correspondence between nets and the track patterns in some embodiments in that when a rule is associated with a specific track pattern, the nets implemented by a physical implementation tool under the guidance of the rule must also conform to the properties or constraints as declared or specified in the specific track pattern.

In some embodiments, the association between a rule and a track pattern may be done by creating a track pattern constraint, which may be declared by using the following exemplary syntax in some embodiments:

set_layer_constraint - group <constraintGroup> -constraint trackPattern -StringValue TP_M2__2x -layer M2

As suggested in "set_layer_constraint", a track pattern constraint constitutes a layer constraint in that a track pattern constraint applies to layers in a similar manner as a spacing constraint does to layers. In the above example, if the "-group" is declared to be, for example, "2x", then the rule "2x" is to be associated with the track pattern "TP_M2__2x" as declared above, and the physical implementation tools under the guidance of the rule "2x" are to observe the properties and constraints declared or specified in the track pattern "TP_M2__2x".

Figure 2B:
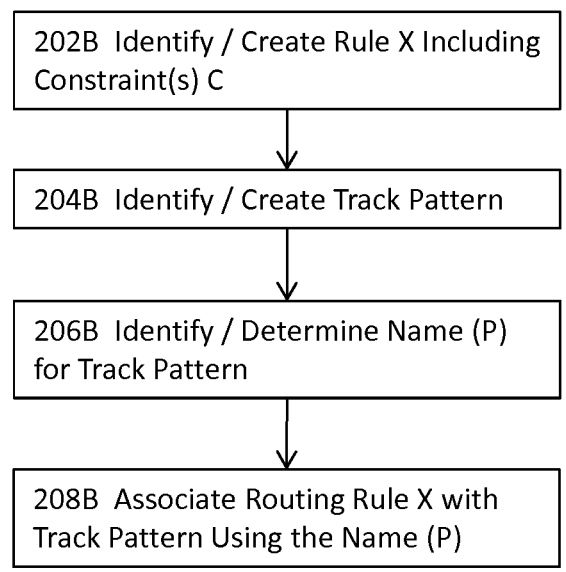
FIG. 2B illustrates a high level flow diagram for associating track patterns with rules for electronic designs in some embodiments.

FIG. 2B illustrates a high level flow diagram for associating track patterns with rules for electronic designs in some embodiments. More specifically, FIG. 2B illustrates a high level flow diagram for associating one or more track patterns with rules in some embodiments. In one or more embodiments, the method for associating track patterns with rules for electronic designs may comprise the process 202B for identifying or creating a rule (X) that includes one or more constraints (C). Process 202B may be performed in substantially similar manners as those described for 202 of FIG. 2A.

In some embodiments, the method may comprise the process 204B for identifying or creating one or more track patterns. In some embodiments, process 204B identifies or creates one or more track patterns on layer L. As described above with reference to FIG. 2, a track pattern applies to all layers if the "-layer" attribute is not specified. Process 204B may be performed in substantially similar manners as those described for 204 of FIG. 2A.

In some embodiments, the method may comprise the process 206B for identifying or determine a track pattern name or identifier (P) (collectively "name") for each of the one or more track patterns identified or created at 204B. Unlike conventional track pattern specification that merely specifies the widths and spacing values of each tracks (e.g., $S_1 W_1 S_2 W_2 S_3 W_3 \ldots S_n$), these embodiments create or identify a track pattern name for a track pattern so that various processes may further use the track pattern name to achieve various purposes.

In some embodiments, the method may comprise the process 208B for associating rule X with a track pattern using the name (P). Process 208B may be performed in substantially similar manners as those described for 206 of FIG. 2A. In the illustrative embodiments shown in FIGS. 2A-B, a rule for guiding physical implementation tools may be associated with a track pattern. Therefore, various embodiments automatically implement electronic designs while complying with the constraints, requirements, and properties (collectively "constraints" or "requirements") as specified in the rule and the track pattern. For example, a customer may require certain wire or interconnect patterns be implemented with a particular width (e.g., 2x-width wires) in a particular arrangement as prescribed by the pattern provided by the customer (e.g., 1,000 2x-width interconnects with a spacing value of 0.064 between two adjacent interconnects), various embodiments may associate a rule that guides a router to implement 2x-width interconnects with a track pattern specifying "-repeat 1000" and "-spacing 0.064" by using, for example, the set_layer_constraint described above.

Figure 3:
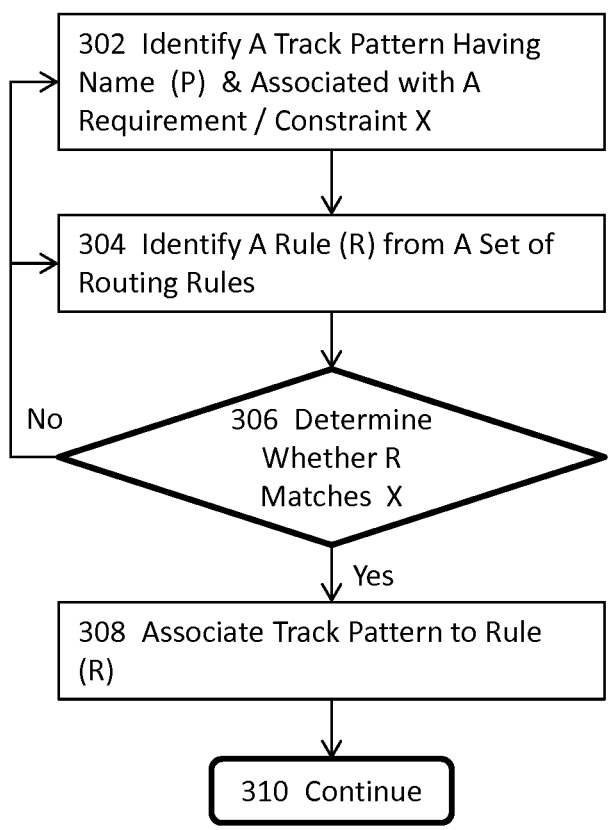
FIG. 3 illustrates a flow diagram for associating track patterns with rules for electronic designs in some embodiments.

FIG. 3 illustrates a flow diagram for associating track patterns with rules for electronic designs in some embodiments. More specifically, FIG. 3 illustrates a flow diagram for automatic association of one or more track patterns with a rule that is used to guide physical implementation tools. In one or more embodiments, the method for associating track patterns with rules for electronic designs may comprise the process 302 for identify a track pattern having name (P) and associated with one or more requirements or constraints (X). For example, process 302 may identify a track pattern that specifies, among other things, a specific pattern for the tracks from a customer requiring the tracks are to be used to implement interconnects of a specific width. Process 302 may by itself or in conjunction with one or more other processes or modules interpret the track pattern to identify such rule(s) or constraint(s) required by the track pattern. For example, process 302, a parsing module, one or more syntactic/semantic analysis modules, or a translation or conversion module may parse the track pattern specification, interpret the specification, and extract the constraints or requirements (X) from the track pattern specification.

In some embodiments, the method may comprise the process 304 for identifying a rule (R) from a set of rules. In some of these embodiments, the set of rules is used to guide physical implementation tools to implement electronic designs. In some embodiments, a rule includes the specification of one or more requirements or constraints that produce legal implementations of the electronic design. For example, a rule may include a width constraint that requires or allows 1x-width interconnects for physical implementation.

In some embodiments, the method may comprise the process 306 for determining whether one or more constraints or characteristics of the rule R matches the corresponding one or more constraints or characteristics (e.g., the one or more requirements or constraints X identified at 302) of the track pattern. For example, process 304 may identify a rule "1x" that requires or allows 1x-width interconnects, and process 302 may identify a track pattern that requires its tracks be used for 1x-width interconnects. In this example, process 306 may thus determine that the rule R matches the track pattern requirement or constraint X. In some embodiments where the method determines that R does not match X, the method may return to 304 to identify the next rule and repeat the processes 304-306, or the method may return to 302 to identify the next track pattern and repeat processes 302-306. In some embodiments where the method determines that R matches X at 306, the method may proceed to 308. It shall be noted that "matching" does not necessarily mean or require that a requirement of a track pattern is an exact counterpart of that of a rule, or vice versa. Rather, "matching" means that the requirement or constraint of a track pattern produces equal effects as the corresponding requirement or constraint of a rule.

In some embodiments, the method may comprise the process 308 for associating the track pattern identified at 302 with the rule identified at 304. Process 308 may be performed in substantially the same manner as those described for 208 of FIGS. 2 and 208B of FIG. 2B. Then the method may proceed to 310 to continue with other processes. In some embodiments, the method at 310 may return to 302 to identify the next track pattern and repeat the processes described above to associate rules with track patterns.

Figure 4:
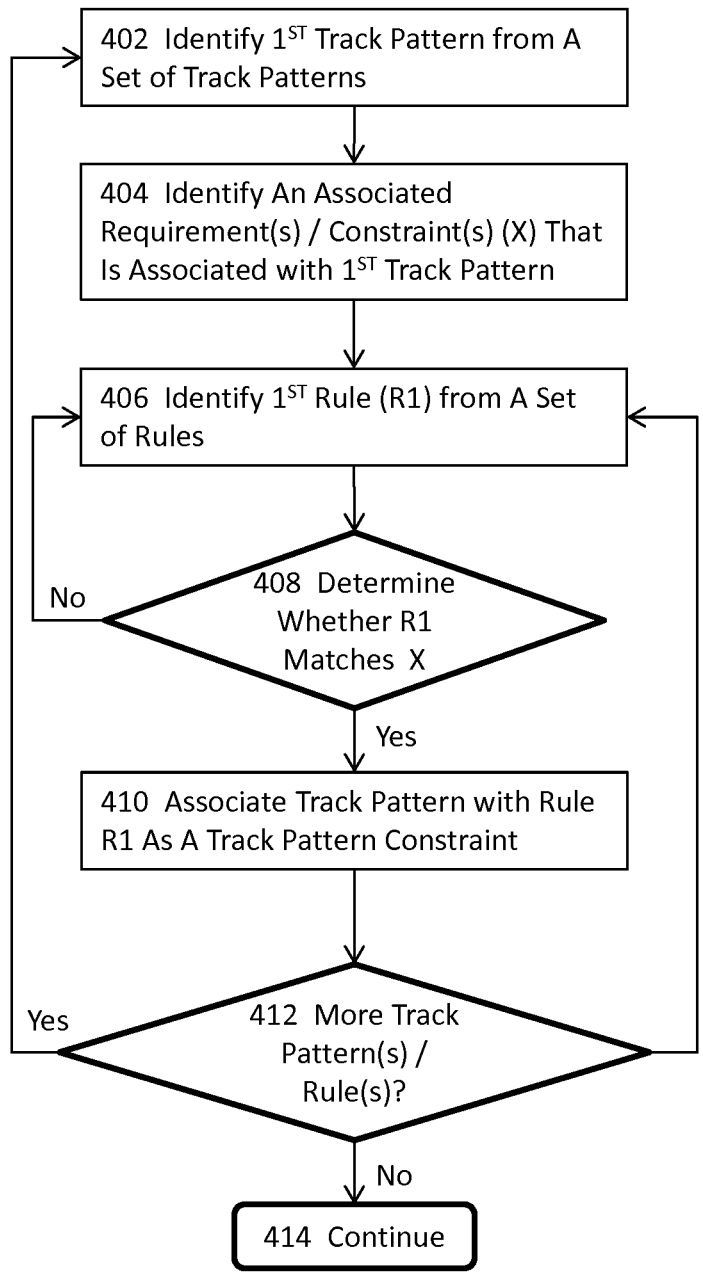
FIG. 4 illustrates a more detailed flow diagram for associating track patterns with rules for electronic designs in some embodiments.

FIG. 4 illustrates a more detailed flow diagram for associating track patterns with rules for electronic designs in some embodiments. In one or more embodiments, the method for associating track patterns with rules for electronic designs may comprise the process 402 for identifying a first track pattern from a set of track patterns. In some embodiments, process 402 identifies the first track pattern from a customer or a foundry.

In some embodiments, the method may comprise the process 404 for identifying a requirement or constraint (X) that is associated with a first track pattern. Process 404 may be performed in substantially similar manners as those described for 302 of FIG. 3 above. In some embodiments, the method may comprise the process 406 for identifying the first rule (R1) from a set of rules that are used to guide physical implementation tools to implement an electronic design at various stages.

In some embodiments, the method may comprise the process 408 for determining whether one or more constraints or characteristics of the rule R1 matches the corresponding one or more constraints or characteristics (e.g., the one or more requirements or constraints X identified at 404) of the track pattern. In some embodiments, the method may comprise the process 410 for associating the first track pattern with rule R1 as a track pattern constraint. Process 410 may be performed in substantially similar manners as those described for 208 of FIG. 2, 208B of FIG. 2B, and 308 of FIG. 3 above.

In some embodiments, the method may comprise the process 412 for determining whether there are one or more additional track patterns to be associated with a specific rule identified at 406 or whether there are one or more rules to be associated with a specific track pattern identified at 402. The method may proceed from 412 to 402 to further identify one or more additional track patterns to process in some embodiments. In some embodiments, the method may proceed from 412 to 406 to identify an additional rule to determine whether or not the addition rule identified at 406 is to be associated with the first track pattern identified at 402. In some embodiments where the method determines that there is no additional rule or track pattern for processing, the method may comprise the process 414 for continuing with other processes, such as tessellation of a design space, association of track patterns with regions, physical implementation of the electronic design, etc.

Figure 5:
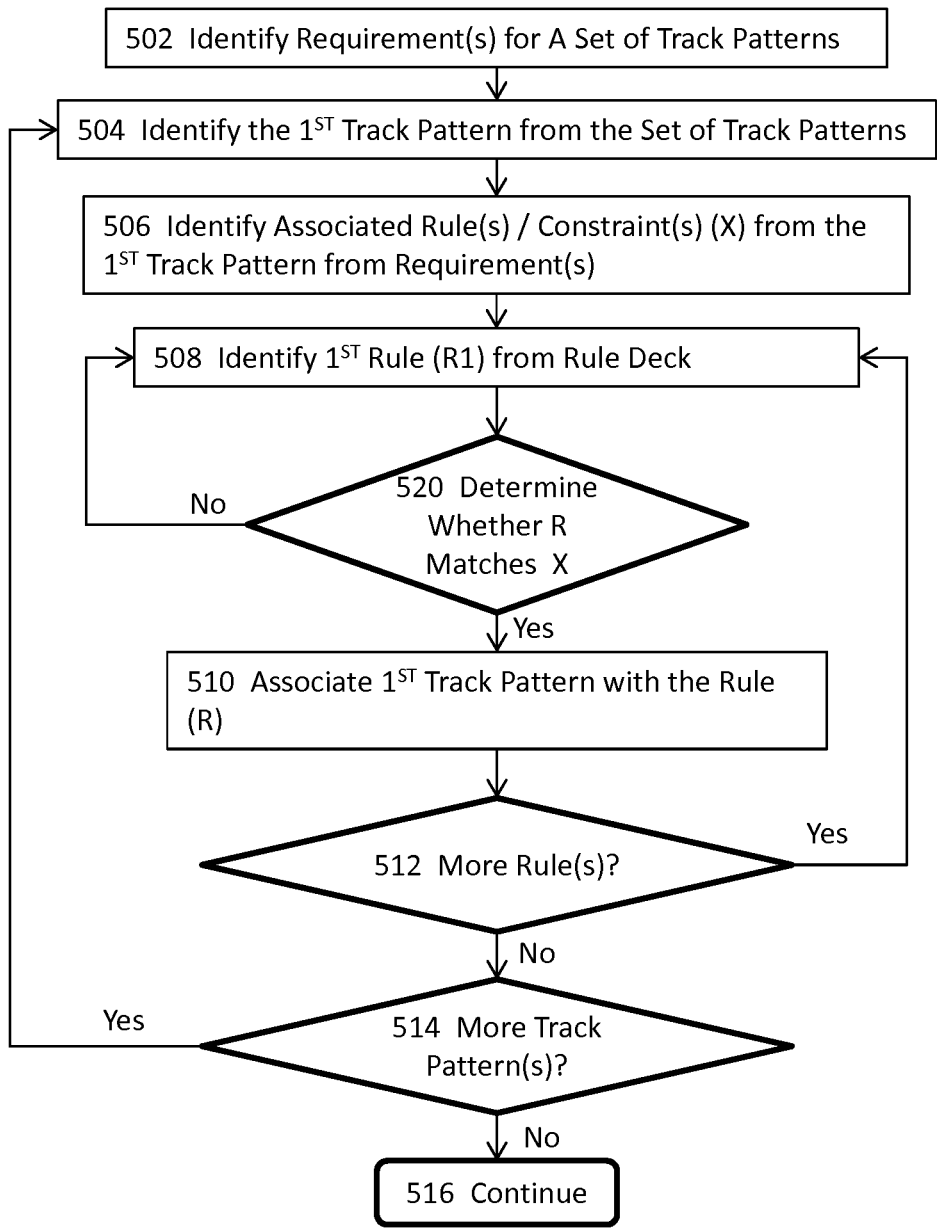
FIG. 5 illustrates a more detailed flow diagram for associating track patterns with rules for electronic designs in some embodiments.

FIG. 5 illustrates a more detailed flow diagram for associating track patterns with rules for electronic designs in some embodiments. In one or more embodiments, the method for associating track patterns with rules for electronic designs may comprise the process 502 for identifying one or more requirements from a set of one or more track patterns. For example, process 502 may identify the specific arrangement of tracks, the spacing, the layer on which the tracks reside, the width or other dimensional requirement of a track pattern from a set of one or more track patterns. In some embodiments, the set of one or more track patterns includes a track pattern that is provided by a customer or a foundry and is specified in a variety of manners or languages. In some embodiments, a track pattern may be provided by a customer or a foundry and thus may be of any format and may be presented in any format. As a result, process 502 may identify the one or more requirements from a set of track patterns by performing substantially similar actions as those described for 302.

In some of these embodiments, the method may comprise the process 504 for identifying the first track pattern from the set of track patterns. In some embodiments, the first track pattern comprises a track pattern that is provided by a customer or a foundry and is specified in a variety of manners or languages. For example, the track pattern may assume the form of $S_1\ W_1\ S_2\ W_2\ S_3\ W_3\ \ldots\ S_n$, where $S_i$ denotes the spacing value for the i-th track from (i−1)-th track, and $W_i$ denote the width requirement of the i-th track, and the track pattern may be specified in a variety of different languages.

In some of these embodiments, the method may comprise the process 506 for identifying one or more associated rules or one or more constraints (X) that are associated with the first track pattern from requirement(s). In some embodiments, process 506 may interpret the first track pattern to identify or determine the one or more rules or one or more constraints arising from the first constraint. Process 506 may, either by itself or in conjunction with one or more other processes or modules, interpret the first track pattern to identify the one or more rules or constraints required by the track pattern. For example, process 506 may invoke a parsing module, one or more syntactic/semantic analysis modules, or a translation or conversion module to parse the track pattern specification of the first track pattern, interpret the specification, and extract the one or more rules or constraints (X) from the first track pattern.

In some of these embodiments, the method may comprise the process 508 for identifying first rule (R1) from, for example, a rule deck that includes a plurality of rules that may be used to guide various electronic design implementation tools. In some of these embodiments, the method may comprise the process 520 for determining whether one or more constraints or characteristics of the rule R1 match the corresponding one or more constraints or characteristics (e.g., the one or more rules or constraints X identified at 506) of the first track pattern. Process 520 may be performed in substantially similar manners as those described for 306 of FIGS. 3 and 408 of FIG. 4. In some embodiments where the method determines that R and X do not match at 520, the method may return to 508 to identify the next rule and repeat the process 508-520. In some embodiments where the method determines that R and X do match at 520, the method may proceed to 510.

In some of these embodiments, the method may comprise the process 510 for associating the first track pattern with the first rule. For example, process 510 may associate the first track pattern with the first rule by using the set_layer_constraint described above. Process 510 may be performed in substantially similar manners as those described for 208 of FIG. 2A, 208B of FIG. 2B, 308 of FIGS. 3, and 408 of FIG. 4.

In some of these embodiments, the method may comprise the process 512 for determining whether or not there is an additional rule to be processed. In some embodiments where the method determines that there is an additional rule to be processed at 512, the method may return to 508 to identify the additional rule and repeat the processes 508-512 until no more additional rules need to be processed. In some embodiments, the method may parse the track patterns into various tokens (e.g., a segment of data representing a constraint for a certain aspect of a design such as a width limitation for routing interconnects inferred from the name of the track pattern) and construct a data structure (e.g., a database) to store various attributes or characteristics corresponding to the various tokens. The method may further index such a data structure such that for any sets of constraints or requirements from a rule, the method may quickly determining the track patterns that match the constraints or requirements from the rule by, for example, querying the database storing various attributes of the track patterns.

In these embodiments, the method may also establish a link between each track pattern representation in the data structure and the track pattern specification or declaration so that the method may quickly identify the desired track pattern specification or declaration. In some other embodiments where a rule deck is used accommodate various rules, the method may parse a rule into various tokens (e.g., a segment or piece of data representing a constraint for a certain aspect of a design such as a width limitation for routing interconnects) and construct a data structure (e.g., a database) to store various attributes or characteristics corresponding to the various tokens of the rule. The method may also index the data structure. In these embodiments, the method may quickly identify matching rules, when provided with a specific track pattern, by querying the data structure of the rules. In some embodiments where the method determines that there is no additional rule to be processed at 512, the method may proceed to 514.

In some of these embodiments, the method may comprise the process 514 for determining whether or not there is an additional track pattern to be processed. In some embodiments where the method determines that there is an additional track pattern to be processed at 514, the method may return to 504 to identify the additional track pattern and repeat the processes 504-514 until all track patterns of interest are processed. Otherwise, the method may proceed to 516 to continue with other processes such as tessellation, physical implementation, etc.

Figure 6:
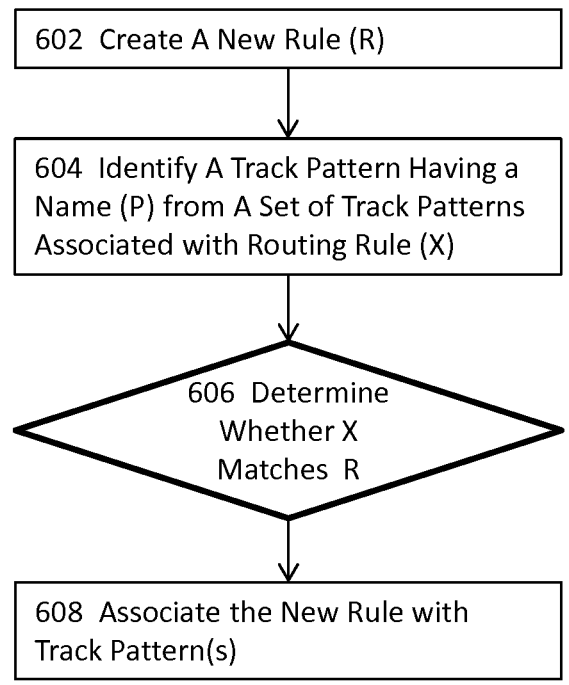
FIG. 6 illustrates a flow diagram for associating track patterns with rules for electronic designs in some embodiments.

FIG. 6 illustrates a flow diagram for associating track patterns with rules for electronic designs in some embodiments. More specifically, FIG. 6 illustrates a flow diagram for creation of a rule and automatic association of the newly created rule with one or more track patterns in some embodiments. These embodiments provide a seamless approach to automatically associate newly created rules with track patterns such that the users or designers no longer need to decipher each track pattern, and then to explicitly edit each rule by adding or revising relevant constraints required by the track patterns to each rule. This approach is especially useful in modern electronic designs because modern electronic design automation (EDA) tools automatically generate rules to guide such tools.

In one or more embodiments, the method for associating track patterns with rules for electronic designs may comprise the process 602 for creating a new rule (R). For example, process 602 may create a new routing rule that is to be used to guide a router to determine the interconnects for electronic designs or a placement rule that is to be used to guide a placement tool to determine drop locations of various blocks, pins, etc. in a layout of an electronic design. In some embodiments, the new rule is automatically generated by electronic design automation tools. The new rule may be created to incorporate one or more requirements or constraints such as minimum spacing constraint, wire width constraint, constraint on parallel run-length, corner-spacing constraint, or any other rules, constraints, or complex constraints.

In some of these embodiments, the method may comprise the process 604 for identifying a track pattern having a name (P) from a set of track patterns, where the track pattern is associated with or requires one or more constraints or requirements (X). For example, the track pattern may be associated with or require a specific arrangement of tracks at certain spacing or a specific width constraint for interconnects implemented with the tracks in the track pattern.

In some of these embodiments, the method may comprise the process 606 for determining whether one or more constraints or characteristics of the rule R matches the corresponding one or more constraints or characteristics (e.g., the one or more requirements or constraints X identified at 604) of the track pattern. Process 606 may be performed in substantially similar manners as those described for 306 of FIG. 3, 408 of FIGS. 4, and 520 of FIG. 5 above. It shall be noted that "matching" does not necessarily mean or require that a requirement of a track pattern is an exact counterpart of that of a rule, or vice versa. Rather, "matching" means that the requirement or constraint of a track pattern produces equal effects as the corresponding requirement or constraint of a rule.

In some of these embodiments, the method may comprise the process 608 for associating the new rule with one or more track patterns that are determined by 606 to match the corresponding requirements or constraints of the rule. In some embodiments, process 608 associates the new rule with the track pattern by adding the name of the track pattern to a layer constraint (e.g., a trackPattern constraint) for the new rule. Process 608 may be performed in substantially similar manners as those described for 208, 208B, 308, 408, or 510 in FIGS. 2-5 above.

Figure 7:
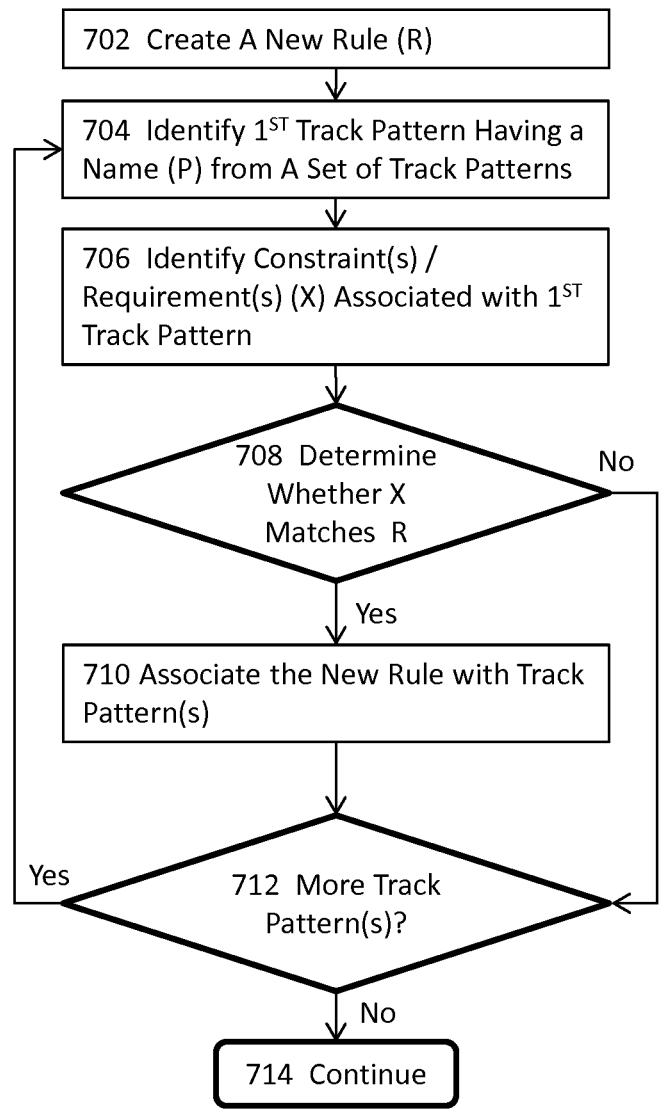
FIG. 7 illustrates a more detailed flow diagram for associating track patterns with rules for electronic designs in some embodiments.

FIG. 7 illustrates a more detailed flow diagram for associating track patterns with rules for electronic designs in some embodiments. In one or more embodiments, the method for associating track patterns with rules for electronic designs may comprise the process 702 for creating a new rule (R).

In some of these embodiments, the method may comprise the process 704 for identifying a first track pattern having a name (P) from a set of track patterns. In some of these embodiments, the method may comprise the process 706 for identifying one or more constraints or requirements (X) associated with the first track pattern. Process 706 may by itself or in conjunction with the track pattern operation or manipulation module 102 which may include or invoke one or more other processes or modules interpret the track pattern to identify such rule(s) or constraint(s) required by the track pattern. For example, process 706 may work in conjunction with a parsing module, one or more syntactic or semantic analysis modules, or a translation or conversion module to parse the first track pattern specification, interpret the specification of the first track pattern, and extract the one or more constraints or requirements (X) from the first track pattern specification.

In some of these embodiments, the method may comprise the process 708 for determining whether one or more constraints or characteristics of the new rule R matches the corresponding one or more constraints or characteristics (e.g., the one or more requirements or constraints X identified at 706) of the track pattern. In some of these embodiments, the method may comprise the process 710 for associating the new rule with one or more track patterns that are determined by 708 to match the corresponding requirements or constraints of the rule. In some embodiments, process 710 associates the first track pattern with the new rule by adding a track pattern constraint based on the first track pattern to the new rule. Process 710 may be performed in substantially similar manners as those described for 208, 208B, 308, 408, 510, or 608 in FIGS. 2-6 above.

In some of these embodiments, the method may comprise the process 712 for determining whether there is an addition track pattern to be processed. If the method determines that there is an additional track pattern to be processed at 712, the method may return to 704 to identify the additional track pattern and repeat processes 704-712 until all track patterns of interest have been processed before the method proceeds to 714. In some of these embodiments, the method may comprise the process 714 for continuing with other processes such as grouping of track patterns, tessellation, physical implementation, etc.

Figure 8:
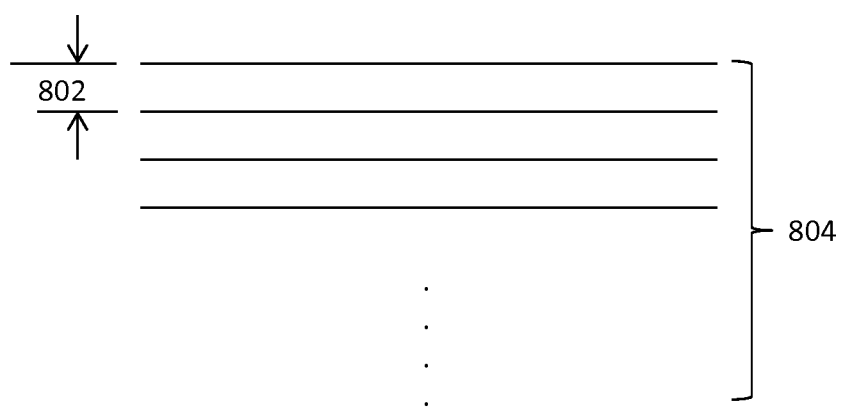
FIG. 8 illustrates an exemplary pattern group in some embodiments.

FIG. 8 illustrates an exemplary track pattern in some embodiments. More specifically, FIG. 8 illustrates a exemplary track pattern 804 having a plurality of horizontal tracks with a spacing 802 and a certain number of repetitions for the tracks in the track pattern.

Figure 9:
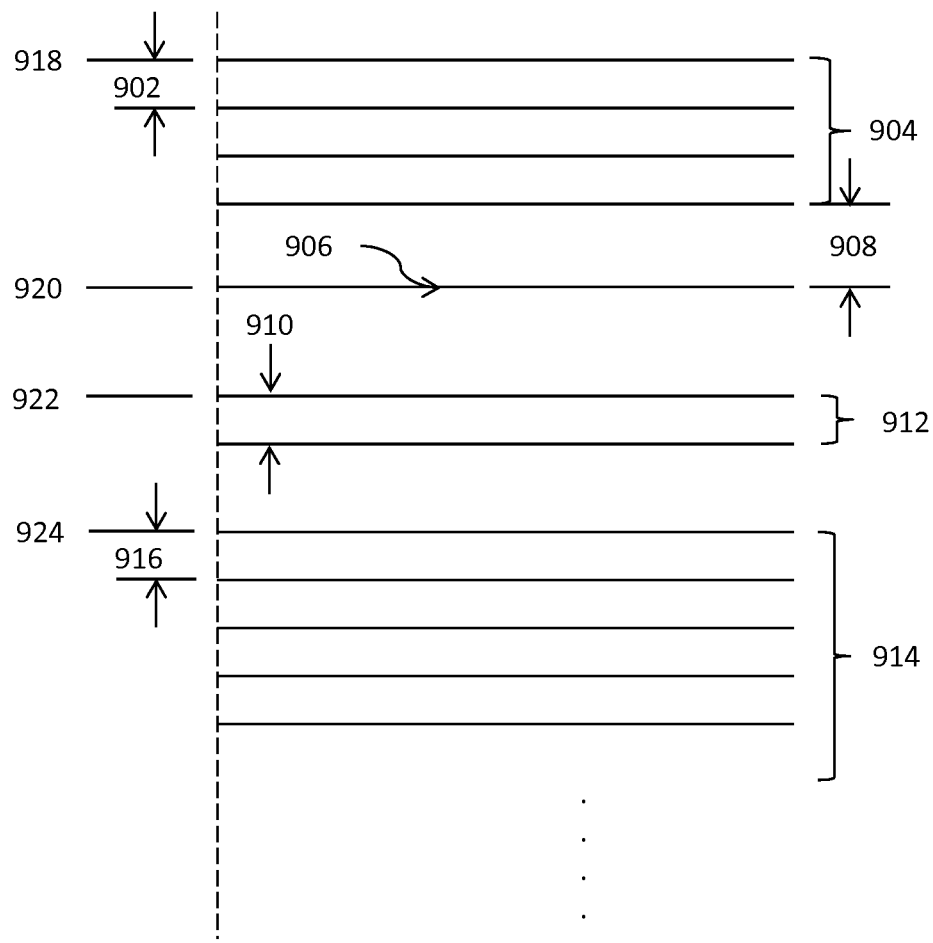
FIG. 9 illustrates another exemplary pattern group in some embodiments.

FIG. 9 illustrates another exemplary track pattern group in some embodiments. More specifically, FIG. 9 illustrates an exemplary track pattern group having non-uniform tracks. The exemplary track pattern group includes four track patterns—904, 906, 912, and 914. The first track pattern 904 includes four tracks at a spacing 902 and a start location 918.

The first track pattern 904 may be specified as "set_track_pattern -layer M1 -x false -start <y-location for 918> -spacing <value for 902> -repeat 3 -name TP_M1__2x -color_pattern BBRR -patternGroupName Non_Unif_TP_Grp". The second track pattern 906 is at a prescribed distance 908 from the bottom track of track pattern 904 and includes a single track with a start location 920. Note that in the track pattern specification for the track pattern 906, the "-repeat" attribute is "0" to indicate a single track, and the "-spacing" attribute need not be specified.

The second pattern group 906 may be specified as "set_track_pattern -layer M1 -x false -start <y-location for 920> -spacing <null> -repeat 0 -name TP_M1__3x -color_pattern B -patternGroupName Non_Unif_TP_Grp". The third track pattern 912 includes two tracks at some spacing 910 with a start location 922. The third track pattern may be specified as "set_track_pattern -layer M1 -x false -start <y-location for 922> -spacing <value for 910> -repeat 1 -name TP_M1__1x -color_pattern RB -patternGroupName Non_Unif_TP_Grp". The fourth track pattern 914 includes a number of tracks at a spacing 916 and a start location 924. The fourth track pattern 914 may be specified as "set_track_pattern -layer M1 -x false -start <y-location for 924> -spacing <value> -repeat <value> -name TP_M1__1x -color_pattern BBRR -patternGroupName Non_Unif_TP_Grp".

In this example, the method groups or aggregates four different track patterns (904, 906, 912, and 914) by assigning the same track pattern group name ("-patternGroupName Non_Unif_TP_Grp") to each of the track patterns to form the non-uniform track pattern in some embodiments illustrated in FIG. 9.

Figure 10:
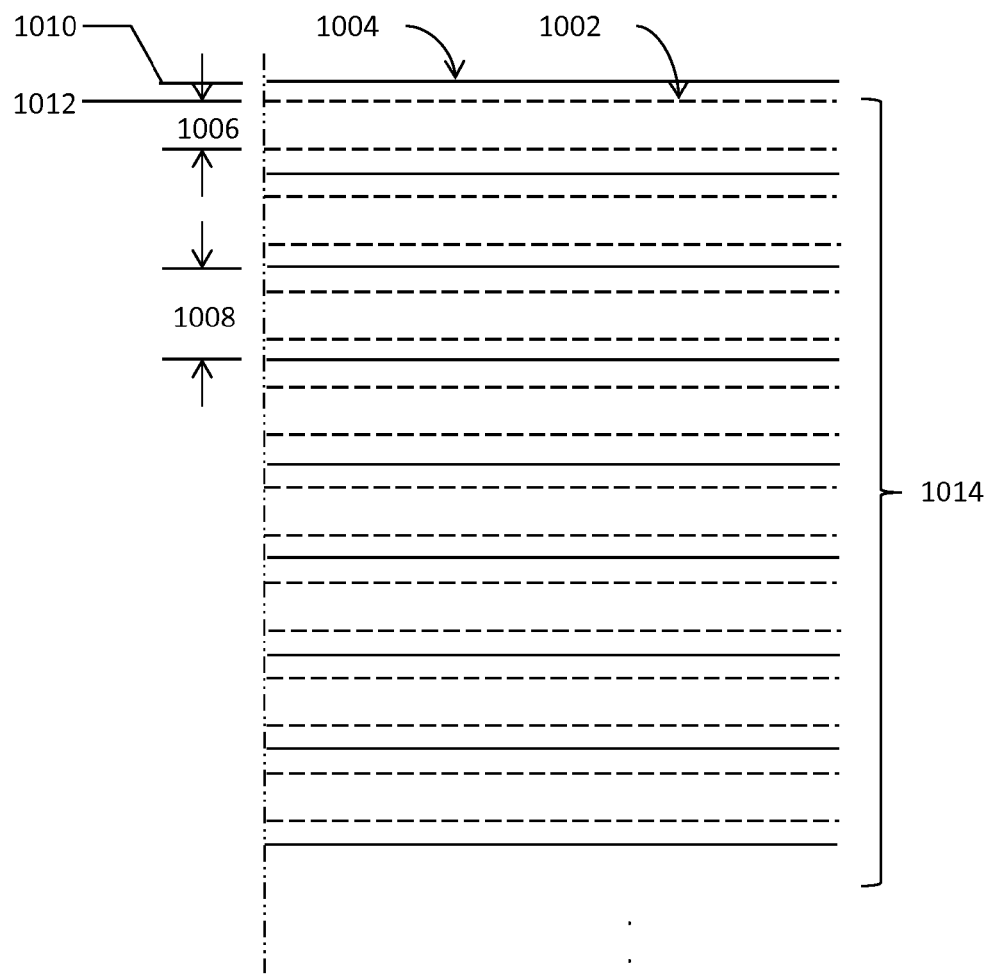
FIG. 10 illustrates another exemplary pattern group in some embodiments.

FIG. 10 illustrates another exemplary track pattern group in some embodiments. More specifically, FIG. 10 illustrates another exemplary track pattern group including two track patterns 1002 and 1004. In some embodiments, the method may assign the same track pattern group name to both track pattern 1002 and track pattern 1004 to group these two track patterns together. For example, the first track pattern 1002 has a start location 1012 and a spacing 1006 for a number of repetitions.

The first track pattern 1002 may thus be specified as "set_track_pattern -layer M2 -x false -start <y-location for 1012> -spacing <value for 1006> -repeat <value for 1014> -name TP_M2_1 x-color_pattern BRBR -patternGroupName 1x_2xTPGrp". The second track pattern 1004 has a start location 1010 with a spacing 1008 and a number of repetitions and may be specified as "set_track_pattern -layer M1 -x false -start <y-location for 1010> -spacing <value for 1008> -repeat <value> -name TP_M1_2x -color_pattern BR -patternGroupName 1x_2x_TP_Grp". As the exemplary track pattern group illustrated in FIG. 9, the track pattern group illustrated in FIG. 10 includes two track patterns that are grouped or aggregated to form the track pattern group by having the same "-patternGroupName".

FIG. 11 illustrates some exemplary commands for associating track patterns with rules for electronic designs in some embodiments. 1102 illustrates grouping or aggregating two track patterns—"1xTrack1" and "11xTrack2". The first track pattern "1xTrack1" may be specified or declared as follows:

set_track_pattern -start s1 -repeat 100000 -x false -spacing Val1 -name "1xTrack1" -layer M2 -constraint_group "onex_rule" -pattern_group_name "1x"

The second track pattern "xTrack2" may be specified or declared as follows:

set_track_pattern -start s2 -repeat 100000 -x false -spacing Val2 -name "1xTrack2" -layer M2 -constraint_group "onex_rule" -pattern_group_name "1x"

In 1102, "1xTrack1" and "1xTrack2" are grouped or aggregated to form a first track pattern group by using the same track pattern group name "1x" for the attribute "-pattern_group_name" so that both 1xTrack1 or 1xTrack2 is available for the router to use. In some embodiments, various processes may use the same approach to group or aggregate track patterns into a track pattern group for the purpose of making an area-based correspondence. In the above example, the "constraint_group" attribute is used to associate the track pattern to a wire width. In the above example illustrated in 1102, the "constraint_group" is the same for both track patterns. In some embodiments, various processes described herein may associate different constraint groups together by using the same track pattern group name in "-pattern_group_name".

1104 illustrates grouping or aggregating two track patterns—"1xTrack2" and "2xTrack1". The first track pattern "1xTrack2" may be specified or declared as follows:

set_track_pattern -start s2 -repeat 100000 -x false -spacing Val2 -name "1xTrack2" -layer M2 -constraint_group "onex_rule" -pattern_group_name "1x+2x"

The second track pattern "2xTrack1" may be specified or declared as follows:

set_track_pattern -start s3 -repeat 100000 -x false -spacing Val3 -name "2xTrack1" -layer M2 -constraint_group "twox_rule" -pattern_group_name "1x+2x"

In 1104, "1xTrack2" and "2xTrack1" are grouped or aggregated to form a second track pattern group by using the same track pattern group name "1x+2x" for the attribute "-pattern_group_name" so that both 1xTrack2 or 2xTrack1 is available for the router to use. In some embodiments, various processes may use the same approach to group or aggregate track patterns into a track pattern group for the purpose of making an area-based correspondence. In the above example, the "constraint_group" attribute is used to associate the track pattern to a wire width. In the above example illustrated in 1104, the "constraint_group" is different in these two track patterns as the track pattern 1xTrack2 has "onex_rule" for the "-constraint_group", and the track pattern 2xTrack1 has "twox_rule" for the "-constraint_group". In this example, the method forms a track pattern group "1x+2x" that intersperses tracks for the interconnects with 1x-width and tracks for the interconnects with 2x-width.

Figure 12A:
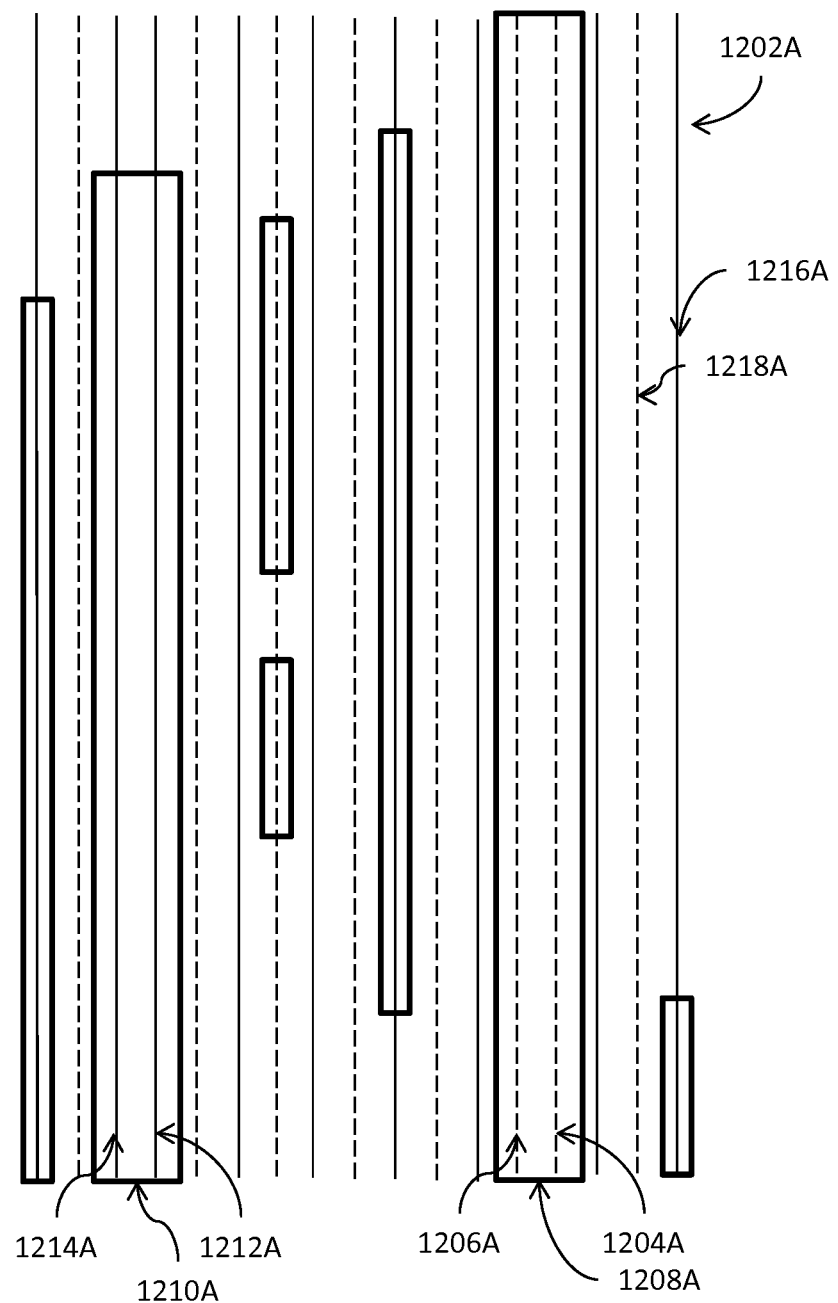
FIG. 12A illustrates the results of an exemplary application of various processes to an exemplary electronic design region subject to track pattern constraints described herein in some embodiments.

FIG. 12A illustrates the results of an exemplary application of various processes to an exemplary electronic design region subject to track pattern constraints described herein in some embodiments. More specifically, FIG. 12 illustrates a track pattern group 1202A that intersperses 1x-track pattern 1216A with another 1x track pattern 1218A. FIG. 12A also illustrates some exemplary implementation of interconnects 1208A and 1210A, both of which represent two interconnects with 3x-width. As it is shown in FIG. 12A, the centerlines of the interconnects with 3x-width (1208A and 1210A) do not coincide with any of the 1x tracks, whereas the centerlines of the other interconnects (with 1x-width) coincide with their respective 1x-tracks in either 1216A or 1218A. For example, FIG. 12A shows that the centerline of 1208A does not coincide with either 1204A or 1206A, both of which are 1x-tracks in track pattern 1218A. FIG. 12A also shows that the centerline of 1210A does not coincide with either 1212A or 1214A, both of which are 1x-tracks in track pattern 1216A.

Figure 12B:
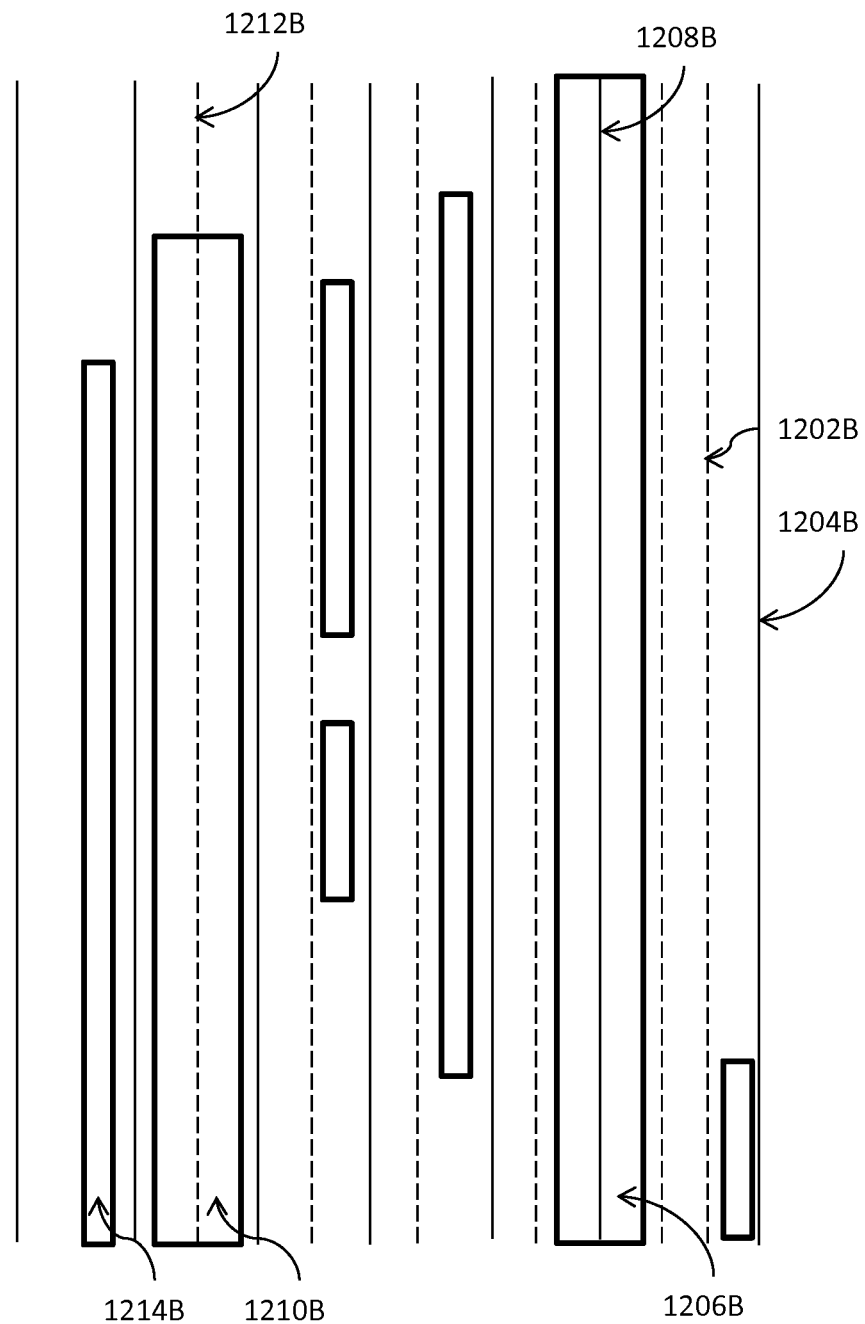
FIG. 12B illustrates the results of the exemplary application of various processes to an exemplary electronic design region subject to track pattern constraints as shown in FIG. 13A in some embodiments.

FIG. 12B illustrates the results of the exemplary application of various processes to an exemplary electronic design region subject to track pattern constraints as shown in FIG. 12A in some embodiments. FIG. 12B illustrates the 3x tracks in two track patterns 1202B and 1204B. As it can be seen, the centerline of the interconnect with 3x-width 1206B coincides with a 3x-track 1208B in the track pattern 1204B, and the centerline of the interconnect with 3x-width 12108 coincides with a 3x-track 1212B in the track pattern 1202B. FIG. 12B also shows that the centerline of the interconnect with 1x-width 1214B does not coincide with any of the 3x-tracks. In this example, this may be due to certain rules prohibiting the use of 3x-tracks to implement interconnects with 1x-width.

System Architecture Overview

Figure 13:
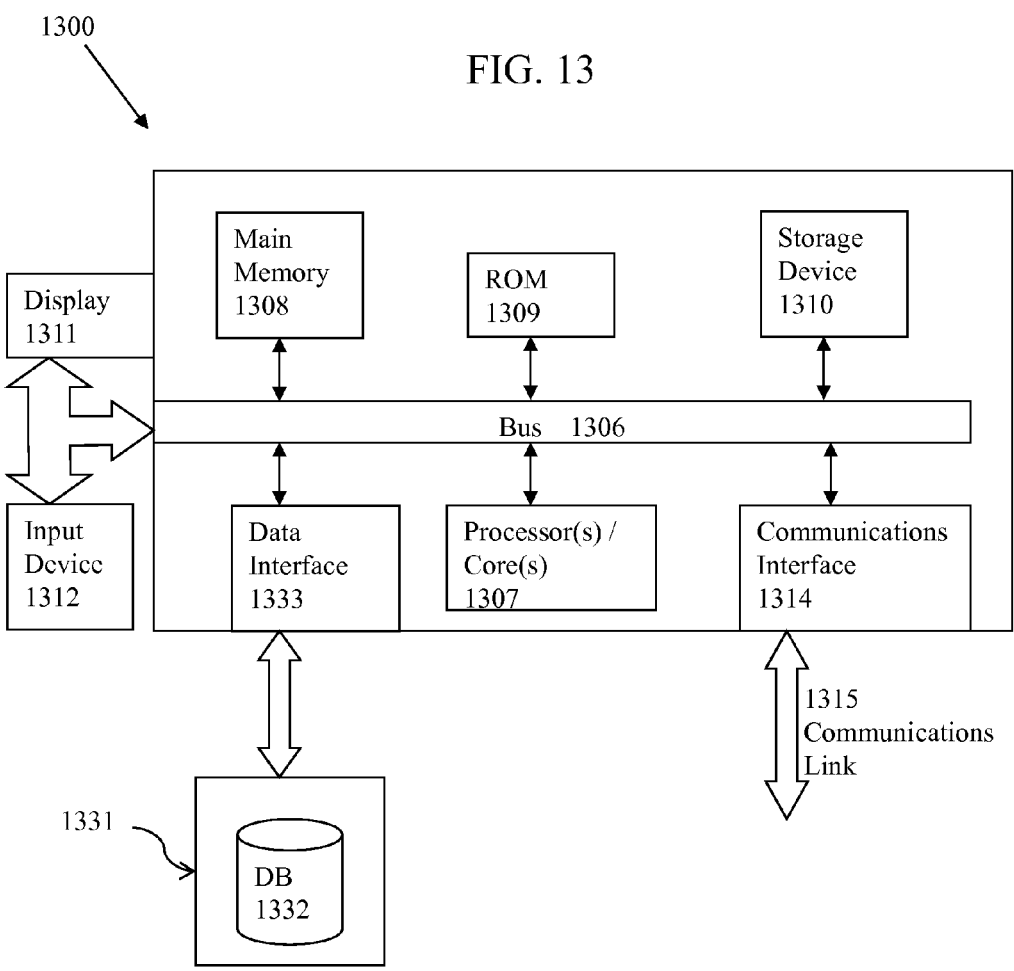
FIG. 13 illustrates a computerized system on which a method for associating track patterns with rules for electronic designs may be implemented.

FIG. 13 illustrates a block diagram of an illustrative computing system 1300 suitable for associating track patterns with rules for electronic designs as described in the preceding paragraphs with reference to various figures. Computer system 1300 includes a bus 1306 or other communication mechanism for communicating information, which interconnects subsystems and devices, such as processor 1307, system memory 1308 (e.g., RAM), static storage device 1309 (e.g., ROM), disk drive 1310 (e.g., magnetic or optical), communication interface 1314 (e.g., modem or Ethernet card), display 1311 (e.g., CRT or LCD), input device 1312 (e.g., keyboard), and cursor control (not shown).

According to one embodiment, computer system 1300 performs specific operations by one or more processor or processor cores 1307 executing one or more sequences of one or more instructions contained in system memory 1308. Such instructions may be read into system memory 1308 from another computer readable/usable storage medium, such as static storage device 1309 or disk drive 1310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1307, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1307 for execution. Such a medium may take many forms, including but not limited to, non-volatile media and volatile media. Non-volatile media includes, for example, optical or magnetic disks, such as disk drive 1310. Volatile media includes dynamic memory, such as system memory 1308.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1300. According to other embodiments of the invention, two or more computer systems 1300 coupled by communication link 1315 (e.g., LAN, PTSN, or wireless network) may perform the sequence of instructions required to practice the invention in coordination with one another.

Computer system 1300 may transmit and receive messages, data, and instructions, including program, i.e., application code, through communication link 1315 and communication interface 1314. Received program code may be executed by processor 1307 as it is received, and/or stored in disk drive 1310, or other non-volatile storage for later execution. In an embodiment, the computer system 1300 operates in conjunction with a data storage system 1331, e.g., a data storage system 1331 that contains a database 1332 that is readily accessible by the computer system 1300. The computer system 1300 communicates with the data storage system 1331 through a data interface 1333. A data interface 1333, which is coupled to the bus 1306, transmits and receives electrical, electromagnetic or optical signals that include data streams representing various types of signal information, e.g., instructions, messages and data. In embodiments of the invention, the functions of the data interface 1333 may be performed by the communication interface 1314.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for implementing an electronic design with track patterns, comprising:
identifying or creating, with a design rule module that is at least partially stored in memory and includes or is coupled with at least one processor or at least one processor core of a computing system, a rule that includes a first requirement for implementation of an electronic design;
identifying or creating a track pattern, wherein
the track pattern comprises a plurality of tracks and a specification of one or more permissible interconnect width values for the plurality of tracks that are used to aid the implementation of the electronic design, and
at least one of the plurality of tracks includes a zero-width line segment on which a centerline of an interconnect lies; and
associating the rule with the track pattern.

2. The computer implemented method of claim 1, the process further comprising:
identifying or creating an identifier for the track pattern; and
creating or updating a constraint by using at least the identifier of the track pattern.

3. The computer implemented method of claim 1, wherein the rule is used to guide one or more physical implementation tools that implement the electronic design, and the physical implementation tools include a floorplanner, a placement tool, a routing tool, a post-route optimization tool, and an engineering change order tool.

4. The computer implemented method of claim 1, the process further comprising:
creating a non-uniform track pattern by aggregating multiple track patterns, wherein the non-uniform track pattern comprises tracks associated with different geometric attributes or different constraints.

5. The computer implemented method of claim 4, the process further comprising:
identifying or creating an identifier for the non-uniform track pattern; and
updating each declaration of the multiple track patterns with the identifier of the non-uniform track pattern.

6. The computer implemented method of claim 1, the act of associating the rule with the track pattern comprising:
creating a constraint that is used to guide physical implementation of the electronic design and includes an identifier of the track pattern and a requirement of the rule, wherein
the requirement of the rule is used to determine whether the rule is to be associated with the track pattern.

7. A system for implementing an electronic design with track patterns, comprising:
a computing system having at least one processor or at least one processor core;
a memory storing thereupon a sequence of instructions which, when executed by the at least one processor or the at least one processor core, cause the at least one processor or the at least one processor core at least to:
identify or create a rule that includes a first requirement for implementation of an electronic design;
identify or create a track pattern, wherein
the track pattern comprises a plurality of tracks and a specification of one or more permissible interconnect width values for the plurality of tracks that are used to aid the implementation of the electronic design, and
at least one of the plurality of tracks includes a zero-width line segment on which a centerline of an interconnect lies; and
associate the rule with the track pattern.

8. The system of claim 7, wherein the at least one processor or at least one processor core is further to:
identify or create an identifier for the track pattern; and
create or update a constraint by using at least the identifier of the track pattern.

9. The system of claim 7, wherein the at least one processor or at least one processor core is further to:
create a non-uniform track pattern by aggregating multiple track patterns, wherein the non-uniform track pattern comprises tracks associated with different geometric attributes or different constraints;
identify or create a identifier for the non-uniform track pattern; and
update each declaration of the multiple track patterns with the identifier of the non-uniform track pattern.

10. The system of claim 7, wherein the at least one processor or the at least one processor core that is to associate the rule with the track pattern is further to:
create a constraint that is used to guide physical implementation of the electronic design and includes an identifier of the track pattern and a requirement of the rule.

11. An article of manufacture comprising a non-transitory computer accessible storage medium having stored thereupon a sequence of instructions which, when executed by at least one processor or at least one processor core executing one or more threads, causes the at least one processor or the at least one processor core to perform a method for implementing an electronic design with track patterns, the method comprising:
identifying or creating, with a design rule module that is at least partially stored in memory and includes or is coupled with at least one processor or at least one processor core of a computing system, a rule that includes a first requirement for implementation of an electronic design;
identifying or creating a track pattern, wherein
the track pattern comprises a plurality of tracks and a specification of one or more permissible interconnect width values for the plurality of tracks that are used to aid the implementation of the electronic design, and
at least one of the plurality of tracks includes a zero-width line segment on which a centerline of an interconnect lies; and
associating the rule with the track pattern.

12. The article of manufacture of claim 11, the process further comprising:
identifying or creating an identifier for the track pattern; and
creating or updating a constraint by using at least the identifier of the track pattern.

13. The article of manufacture of claim 11, the process further comprising:
creating a non-uniform track pattern by aggregating multiple track patterns, wherein the non-uniform track pattern comprises tracks associated with different geometric attributes or different constraints;
identifying or creating a identifier for the non-uniform track pattern; and
updating each declaration of the multiple track patterns with the identifier of the non-uniform track pattern.

14. The article of manufacture of claim 11, the act of associating the rule with the track pattern comprising:
creating a constraint that is used to guide physical implementation of the electronic design and includes an identifier of the track pattern and a requirement of the rule.

15. A computer implemented method for implementing an electronic design with track patterns, comprising:
identifying or creating, with a design rule module that is at least partially stored in memory and includes or is coupled with at least one processor or at least one processor core of a computing system, a track pattern, wherein
the track pattern comprises a plurality of tracks and a specification of one or more permissible interconnect width values for the plurality of tracks that are used to aid implementation of the electronic design, and
at least one of the plurality of tracks includes a zero-width line segment on which a centerline of an interconnect lies;
identifying or creating a rule that is used to guide the implementation of the electronic design;
determining whether the track pattern matches the rule; and
associating the track pattern with the rule.

16. The computer implemented method of claim 15, the act of determining whether the track pattern matches the rule comprising:
identifying a first constraint that is associated with the track pattern;
identifying a relevant part of the first constraint associated with the track pattern;
identifying a corresponding part, which corresponds to the relevant part of the first constraint, of the rule; and
determining whether the relevant part of the first constraint matches the corresponding part of the rule.

17. The computer implemented method of claim 15, the process further comprising:
identifying or creating an identifier of the track pattern; and
creating or updating declaration of the track pattern by adding the identifier to the declaration of the track pattern.

18. The computer implemented method of claim 15, the process further comprising:
determining whether there is an addition rule to be processed;
identifying the additional rule;
determining whether the track pattern matches the addition rule; and
associating the track pattern with the additional rule.

19. The computer implemented method of claim 15, the process further comprising:
determining whether there is an addition track pattern to be processed;
identifying the addition track pattern;
determining whether the additional track pattern matches the rule; and
associating the additional track pattern with the rule.

20. The computer implemented method of claim 15, the process further comprising:
- aggregating multiple track patterns to create an aggregated track pattern;
- identifying or creating an identifier for the aggregated track pattern; and
- updating each declaration of the multiple track patterns with the identifier of the aggregated track pattern.

* * * * *